US009911365B2

(12) United States Patent
Siassi (10) Patent No.: US 9,911,365 B2
(45) Date of Patent: Mar. 6, 2018

(54) VIRTUAL NEONATAL ECHOCARDIOGRAPHIC TRAINING SYSTEM

(71) Applicant: Bijan Siassi, Los Angeles, CA (US)

(72) Inventor: Bijan Siassi, Los Angeles, CA (US)

(*) Notice: Subject to any disclaimer, the term of this patent is extended or adjusted under 35 U.S.C. 154(b) by 0 days.

(21) Appl. No.: 14/733,805

(22) Filed: Jun. 8, 2015

(65) Prior Publication Data

US 2015/0356890 A1 Dec. 10, 2015

Related U.S. Application Data

(60) Provisional application No. 62/009,604, filed on Jun. 9, 2014.

(51) Int. Cl.
| | |
|---|---|
| *G09B 23/28* | (2006.01) |
| *G09B 23/34* | (2006.01) |
| *G09B 23/30* | (2006.01) |

(52) U.S. Cl.
CPC ........... *G09B 23/288* (2013.01); *G09B 23/28* (2013.01); *G09B 23/281* (2013.01);
(Continued)

(58) Field of Classification Search
CPC . G09B 9/00; G09B 9/06; G09B 23/28; G09B 23/281; G09B 23/285; G09B 23/286; G09B 23/30; G09B 23/34
(Continued)

(56) References Cited

U.S. PATENT DOCUMENTS

| | | | | |
|---|---|---|---|---|
| 5,490,507 A | * | 2/1996 | Wilk | G09B 23/281 434/267 |
| 5,509,810 A | * | 4/1996 | Schertz | G09B 23/288 434/262 |

(Continued)

FOREIGN PATENT DOCUMENTS

WO  WO-2013192344  12/2013

OTHER PUBLICATIONS

CAE Healthcare. Transthoracic Echocardiography and Pericardiocentisis Ultrasound Training Model. May 27, 2015 (Retrieved online from Internet Wayback Machine: URL <https://web.archive.org/web/20150515000000*/http://www.bluephantom.com/product/Transthoracic-Echocardiography-and-Pericardiocentesis-Ultrasound-Training-Model.aspx?cid=411>).*

(Continued)

*Primary Examiner* — Nikolai A Gishnock
(74) *Attorney, Agent, or Firm* — Rajendra Gurudas Sardesai (57) ABSTRACT

A neonatal echocardiography training apparatus including (i) a computer; (ii) a life-sized doll mannequin; (iii) a magnetic tracking system including (a) a control module connected to the computer; (b) a magnetic pulse wave generator positioned behind the mannequin and connected to the control module; (c) a sensor-fitted transducer configured to detect magnetic pulse waves from the generator and connected to the control module; and wherein the control module reads data from the generator and transducer and transmits the data to the computer. A method of displaying continuous video clips obtained from slicing of multiple 4D echocardiographic image volumes and 2D video clips activated from the coordinates of specific slices of 4D volumes is described. These echocardiographic images are displayed (Continued)

when a trainee positions the transducer on the desired cardiac acoustic window on the mannequin.

15 Claims, 6 Drawing Sheets

(52) U.S. Cl.
CPC ......... *G09B 23/285* (2013.01); *G09B 23/286* (2013.01); *G09B 23/30* (2013.01); *G09B 23/34* (2013.01)

(58) Field of Classification Search
USPC .................................................. 434/267, 268
See application file for complete search history.

(56) References Cited

U.S. PATENT DOCUMENTS

| | | | |
|---|---|---|---|
| 5,585,089 A | 12/1996 | Queen et al. | |
| 5,609,485 A * | 3/1997 | Bergman | G01S 7/52055 434/267 |
| 6,174,285 B1 * | 1/2001 | Clark | A61B 8/14 128/916 |
| 7,731,499 B2 * | 6/2010 | Sze | G09B 23/286 434/262 |
| 7,845,949 B2 * | 12/2010 | Wilkins | G09B 23/286 434/267 |
| 7,912,258 B2 * | 3/2011 | Warmath | G09B 23/285 382/128 |
| 8,121,669 B2 * | 2/2012 | Porikli | G09B 23/286 600/425 |
| 8,172,753 B2 | 5/2012 | Halmann | |
| 8,992,230 B2 * | 3/2015 | Tuchschmid | G09B 23/28 434/262 |
| 9,349,199 B2 * | 5/2016 | Ruiz | G06T 11/008 |
| 2009/0130642 A1 | 5/2009 | Tada et al. | |
| 2009/0148822 A1 * | 6/2009 | Eggert | G09B 23/281 434/271 |
| 2010/0159434 A1 * | 6/2010 | Lampotang | G09B 9/00 434/365 |
| 2010/0179428 A1 | 7/2010 | Pedersen et al. | |
| 2011/0306025 A1 * | 12/2011 | Sheehan | A61B 8/523 434/267 |
| 2012/0282583 A1 * | 11/2012 | Thaler | G09B 23/28 434/267 |

OTHER PUBLICATIONS

Ahmed, K., et al., "Role of virtual reality simulation in teaching and assessing technical skills in endovascular intervention", J Vasc Interv Radiol, 21, (2010), 55-66.

Bijan Siassi, "International Search Report and Written Opinion", PCT/US2015/034921, (dated Aug. 11, 2015).

Köhler, G., et al., "Derivation of specific antibody-producing tissue culture and tumor lines by cell fusion,", Eur. J. Immunol., Abstract; 6(7), (1976), 511-519.

Leotta, D. F., et al., "Performance of a miniature magnetic position sensor for three dimensional ultrasound imaging", Ultrasound in Med vol. 23, No. 4, (1997), 597-609.

Matyal, R., et al., "Transthoracic echocardiographic simulator. Normal and the abnormal.", Journal of Cardiothoracic and Vascular Anesthesia, vol. 25, No. 1, (Feb. 2011), 177-181.

Neelankavil, J., et al., "Transthoracic Echocardiography is an efficient method to train anesthesiologists in basic transthoracic echocardiography skills.", www.anesthesia-analgesia.org, vol. 115, No. 5, (Nov. 2012), 1042-1051.

Riechmann, L., et al., "Reshaping human antibodies for therapy", Nature, vol. 332, (Mar. 24, 1988), 323-327.

Weidenbach, M., et al., "Augmented reality simulator for training in two-dimensional echocardiography.", Computers and Biomedical Research, 33, (2000), 11-22.

Weidenbach, M., et al., "EchoComTEE—a simulator for transoesophageal echocardiography", Anaesthesia, 62, (2007), 347-353.

Weidenbach, M., et al., "Simulation of congenital heart defects: a novel way of training in echocardiography.", Heart, 95, (2009), 636-641.

Bijan, Siassi, "International Preliminary Report on Patentability and Written Opinion", PCT Application No. PCT/US2015/034921 (dated Dec. 22, 2016).

* cited by examiner

VIRTUAL NEONATAL ECHOCARDIOGRAPHIC TRAINING SYSTEM

CROSS-REFERENCE TO RELATED APPLICATION

The application claims the benefit of the earlier filing date of U.S. Provisional Patent Application No. 62/009,604, filed Jun. 9, 2014 and incorporated herein by reference.

FIELD

The invention relates to devices, methods and systems that serve as simulation platform for teaching neonatal echocardiography.

BACKGROUND

All publications cited herein are incorporated by reference in their entirety to the same extent as if each individual publication or patent application was specifically and individually indicated to be incorporated by reference. The following description includes information that may be useful in understanding the present invention. It is not an admission that any of the information provided herein is prior art or relevant to the presently claimed invention, or that any publication specifically or implicitly referenced is prior art.

Point-of-care echocardiography has become an accepted tool in NICUs. Training and skill maintenance require healthy "volunteers" and patients consenting to participate. Accordingly, subject availability is a significant problem in neonatology especially since repeated, prolonged echocardiography studies can adversely affect the condition of sick preterm and term neonates. Therefore, there is a need for the development of a sophisticated training tool available to trainees.

To address the unmet need, the inventors developed a neonatal echocardiographic simulator for training purposes capable of simulating hands-on experience of obtaining full range of echocardiography studies in a neonate.

DETAILED DESCRIPTION

One skilled in the art will recognize many methods and materials similar or equivalent to those described herein, which could be used in the practice of the present invention. Other features and advantages of the invention will become apparent from the following detailed description, taken in conjunction with the accompanying drawings, which illustrate, by way of example, various features of embodiments of the invention. Indeed, the present invention is in no way limited to the methods and materials described. For convenience, certain terms employed herein, in the specification, examples and appended claims are collected here.

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments, and are not intended to limit the claimed invention, because the scope of the invention is limited only by the claims. Unless otherwise defined, all technical and scientific terms used herein have the same meaning as commonly understood by one of ordinary skill in the art to which this invention belongs.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

Unless otherwise defined herein, scientific and technical terms used in connection with the present application shall have the meanings that are commonly understood by those of ordinary skill in the art to which this disclosure belongs. It should be understood that this invention is not limited to the particular methodology, protocols, and reagents, etc., described herein and as such can vary. The terminology used herein is for the purpose of describing particular embodiments only, and is not intended to limit the scope of the present invention, which is defined solely by the claims.

There is a growing need to obtain critical information on cardiovascular function of neonates at bedside in more detail than has been possible by conventional monitoring techniques and physical examination. Bedside echocardiography is used to obtain, non-invasively, detailed information about cardiac structure and function in patients of all ages. However this technique is rarely available for the neonate since learning the technique of obtaining high quality echocardiograms is a complex procedure and requires acquisition of high degree of technical skills. At present, there is no other method of learning practical neonatal echocardiography except by practicing on live neonates. Due to limitation in access of trainees to healthy neonates and neonates with functional or structural cardiac abnormalities, there remains a significant gap to be filled in by the development of alternative methods of training. As in other areas of medical training, the use of a high fidelity simulator would be an ideal solution. Simulation of transthoracic (TTE) and transesophageal (TEE) echocardiography which is now available in older child and adults, generally use either images obtained from other scanning techniques which are rendered to simulate echocardiographic images or use real TEE/TTE data with limited echocardiographic views and lack full modalities of echocardiography such as color flow, Doppler, and M-mode simulation.

To address these unmet needs, a computer-based neonatal echocardiographic simulator suitable as a learning or training tool for neonatal echocardiography is herein described. In one embodiment, the simulator uses real seven 4D echocardiographic image volumes for continuous 2D echocardiography integrated with 2D video clips of color flow, Doppler and M-Mode to cover full range of transthoracic echocardiographic study.

In various embodiments, virtual neonatal echocardiographic training system (VNETS) is a hybrid integrated system using 2D and 4D echocardiograms to simulate transthoracic echocardiography. VNETS may be used for neonate, and may also be extended to fetus, infant, and child.

The 4D echocardiograms used in the system are real 4D echocardiograms obtained directly from patients rather than rendered 3D images obtained from other imaging modalities such as MRI and modified to look like echocardiograms. Although real 4D echocardiograms for simulation of transthoracic echocardiography has been tried, invariably only one 4D heart volume is used, making it of limited use due to poor image quality obtained from other echocardiographic windows except the ones used in the original acquisition of the image. That is the reason why rendered images are used in almost all commercially available systems. This problem is resolved in VNETS by use of multiple 4D echocardiographic datasets which are arrayed in specific orientation and location to enable detailed imaging from all transthoracic echocardiographic windows. In one embodiment, seven 4D echocardiographic datasets are used for optimal simulation experience.

There is no direct way of playing a 4D echocardiogram, because it will only show the surface of the heart. By generating slices to look inside, a very realistic 2D echocardiogram as if from a live patient is obtained. Going through various slices is seamless in the system to yield a 2D simulation. Unfortunately, there are no 4D color flow, Doppler and M-mode, which are the other essential components of a complete echocardiography in known prior art system. In one embodiment, video loops of color flow, Doppler and M-mode components are provided from 26 specific, clinically diagnostic slices of the seven 4D image volumes. In other words, the 2D echocardiography is continuous, and color flow, Doppler and M-Mode are intermittent.

In order to enhance training with the simulator, in one embodiment, a 3D image of the heart is generated on a side screen or display of the computer monitor demonstrating the slicing plane from each cardiac window as it is manipulated by the trainee. Visualization of 3D position and orientation of the slicing planes further enriches the training experience.

As a hybrid system using integrated real 4D echocardiographic image volumes and 2D echocardiographic video clips for transthoracic echocardiographic simulation, VNETS has many advantages including but not limited to the following: (1) The system uses multiple 4D image volumes oriented to a specific location for slicing to generate real-time 2D echocardiographic simulation; (2) slicing of 4D data sets is done from the same point that the original 4D echocardiograms were recorded from the neonate and are virtually located on their appropriate echocardiographic windows on the mannequin; (3) unlimited slicing is done from the point of origin by Roll, Pitch and Yaw and any of their combination; (4) for neonatal and infant transthoracic simulation, the system uses seven full volume datasets covering the five echocardiographic windows: left parasternal, apical, subcostal, right parasternal, and suprasternal; (5) the coordinates from typical 2D slices from 4D volumes are used to activate video clips of color flow, Doppler, M-Mode obtained from the same neonate. Video clips related to 26 typical 2D slices are used to cover complete range of echocardiographic evaluation in neonates and infants; and (6) any 2D video clip of interest can be captured in a "pause" state and adjusted with frame forward or backward for measurements of functions and dimensions using calculation package.

EXAMPLES

The invention will be further explained by the following Examples, which are intended to be purely exemplary of the invention, and should not be considered as limiting the invention in any way. The following examples are provided to better illustrate the claimed invention and are not to be interpreted as limiting the scope of the invention. To the extent that specific materials are mentioned, it is merely for purposes of illustration and is not intended to limit the invention. One skilled in the art may develop equivalent means without the exercise of inventive capacity and without departing from the scope of the invention.

Example 1

In one non-limiting example, provided is a virtual neonatal echocardiographic training system (VNETS) based on 4D echocardiographic image volume datasets coupled with an extensive library of two-dimensional, color flow, Doppler and M-Mode video clips and a package for cardiac measurements.

Background

At present, there is no method of learning practical Neonatal Echocardiography except by practicing on live neonates. Due to limitation in access of trainees to sick and healthy neonates, there remains a significant gap to be filled in by the development of alternative methods of training. As in other areas of medical training, the use of high fidelity simulator would be an ideal solution. Available echocardiographic simulators are geared to older children and adults with limited neonatal applicability and lack of full range of echocardiographic modalities. To address these unmet needs, a computer-based neonatal echocardiographic simulator is described that uses real seven 4D echocardiographic image volumes for continuous 2D echocardiography integrated with 2D video clips of color flow, Doppler and M-Mode to cover full range of transthoracic echocardiographic study.

Image Acquisition

Seven 4D echocardiographic image volumes are obtained through the five echocardiographic acoustic windows from neonatal patients using 4D scan head in Digital Imaging and Communications in Medicine (DICOM) format. A complete set of 2D echocardiograms of color flow, Doppler and M-Mode are obtained using 2D scan head separately from the same patient and stored in patient folders.

Hardware

Figure 1:
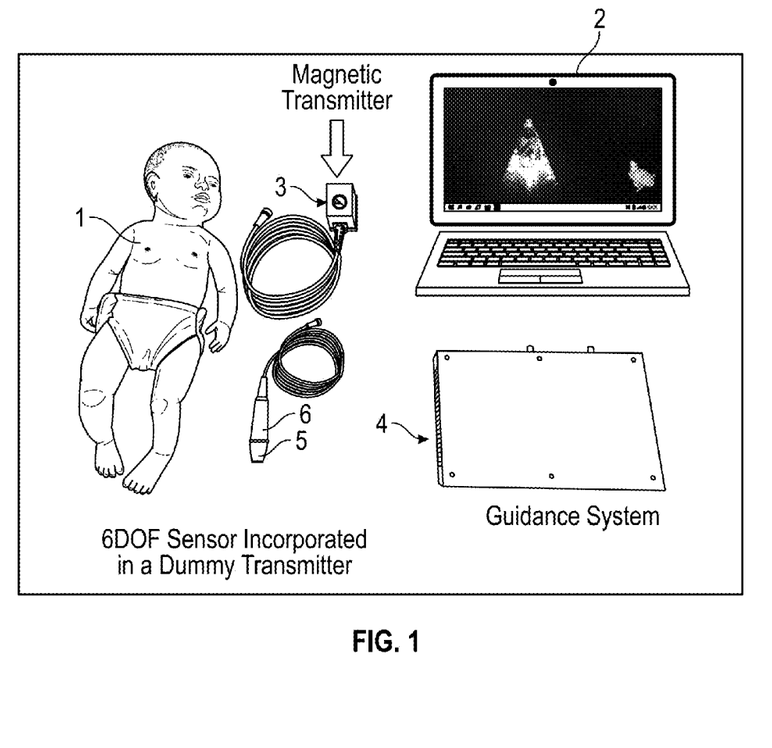
FIG. 1 shows a top view of one embodiment of components of virtual neonatal echocardiographic training system.
Figure 2:
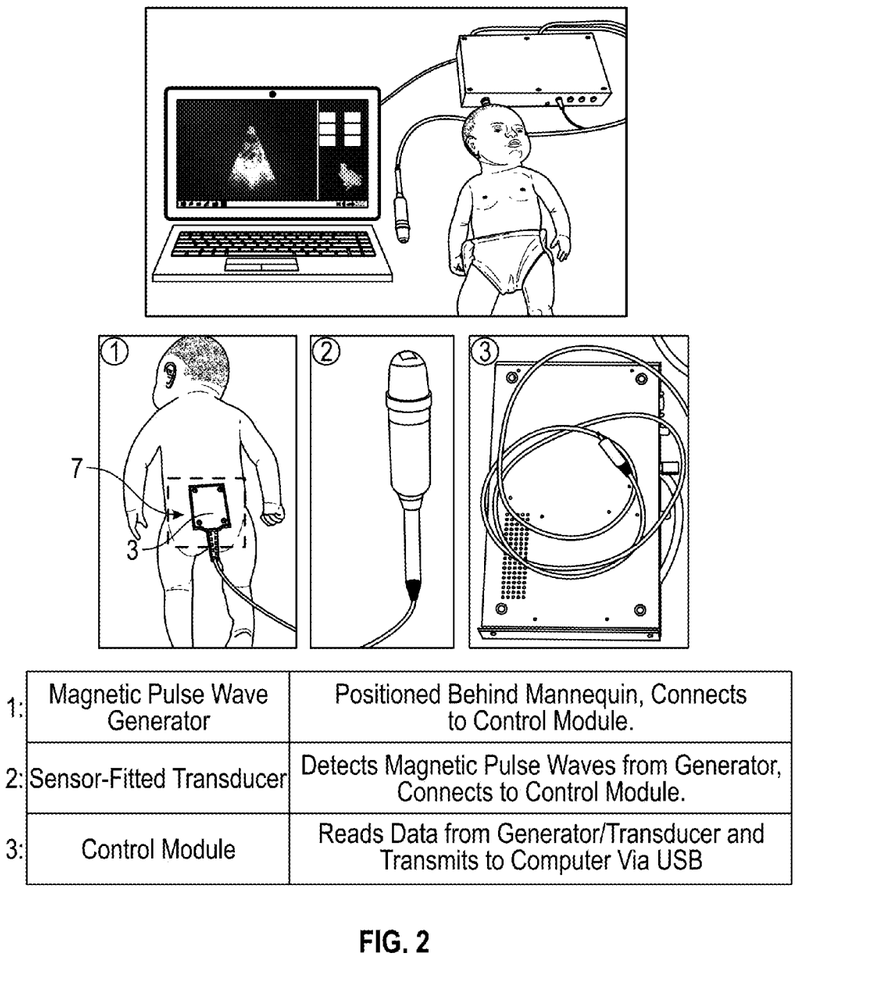
FIG. 2 shows the components of the system of FIG. 1 connected, particularly the mannequin having the magnetic pulse wave generator connected thereto, and the generator and the transducer connected to the computer.

FIG. 1 shows one embodiment of components of virtual neonatal echocardiographic training system. Neonatal mannequin 1, laptop computer 2, magnetic pulse wave generator 3 (e.g., a magnetic transmitter), a control module 4, and six degree of freedom (6DOF) sensor 5, incorporated in a transducer, serve as hardware platform of the simulator. In one embodiment, sensor 5 is in a head of transducer 6 (a distal end) so that the sensor is at a point or adjacent a point where transducer 6 will contact mannequin 1. As shown in FIG. 2, neonatal mannequin 1 may have an opening or cavity 7 within which the magnetic transmitter 3 may be placed. In one embodiment, the opening may be positioned on the back of neonatal mannequin 1. In other embodiments, the magnetic transmitter 3 may be positioned anywhere on or around neonatal mannequin 1 in a fixed position. Magnetic pulse wave generator 3 and the 6DOF sensor 5/dummy transducer 6 are connected to control module 4. Control module 4 may be connected to the laptop computer 2 via, for example, a USB connection. Magnetic pulse wave generator 3 generates magnetic pulse waves that may be detected by 6DOF sensor 5 within transducer 6. In one embodiment, 6DOF sensor 5 within transducer 6 is able to detect the relative x, y, and z coordinates as well as the orientation (rotation, tilt, and angulation; or roll, pitch, and yaw) of 6DOF sensor 5 in transducer 6 relative to magnetic pulse wave generator 3 and neonatal mannequin 1. Control module 4, which is a relay and power supply unit, reads data from the magnetic transmitter and 6DOF sensor 5/transducer 6 and transmits the data to computer 2 via a USB connection.

Software

Figure 3:
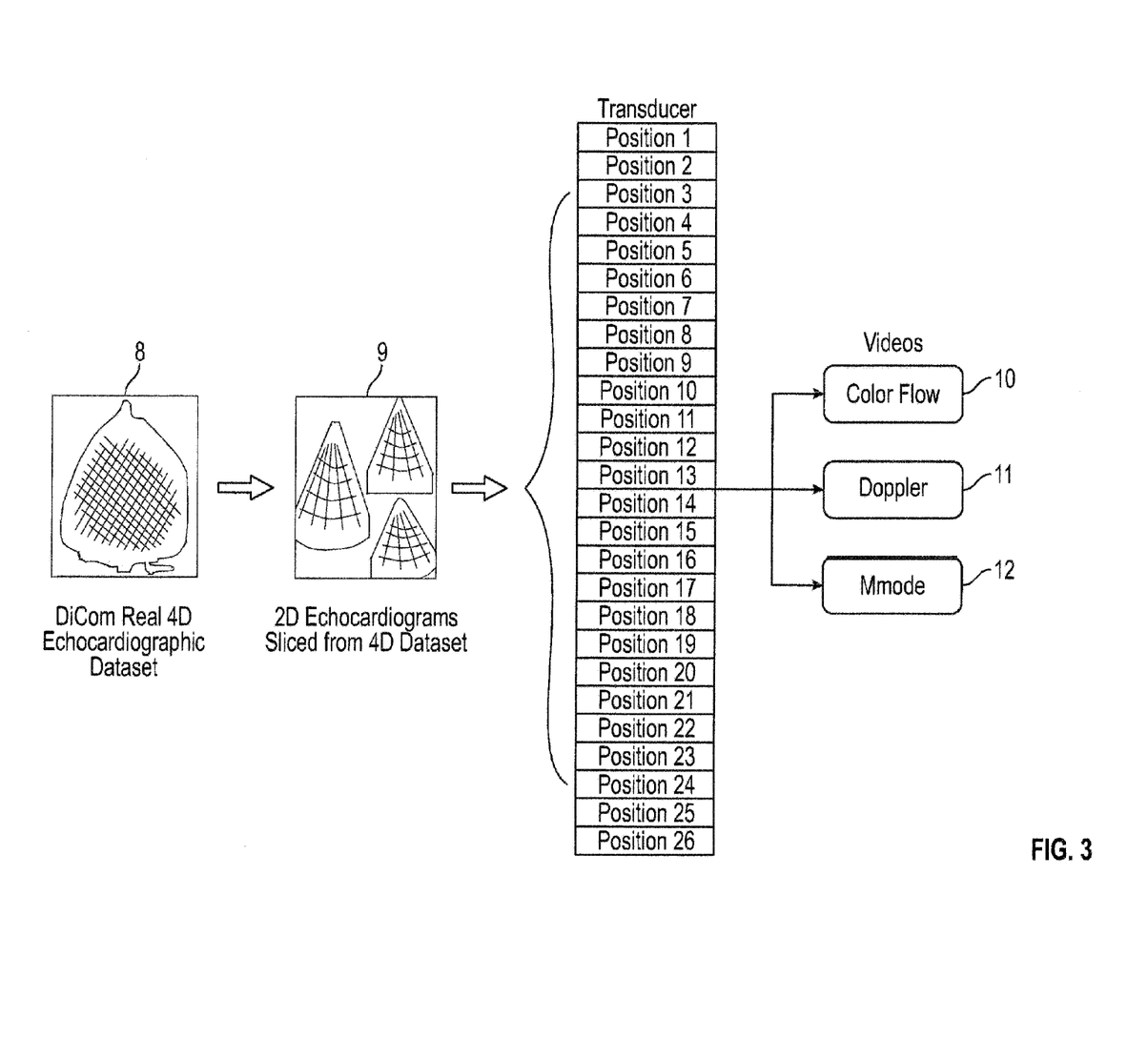
FIG. 3 shows a single 4D image volume representing seven 4D volumes obtained from each patient and aligned together to obtain optimal 2D echocardiograms from each of five echocardiographic windows. Furthermore, coordinates of 26 typical slices obtained from all seven 4D volumes are used to play video loops of color flow, Doppler and M-Mode stored in video file folder in the computer.
Figure 4:
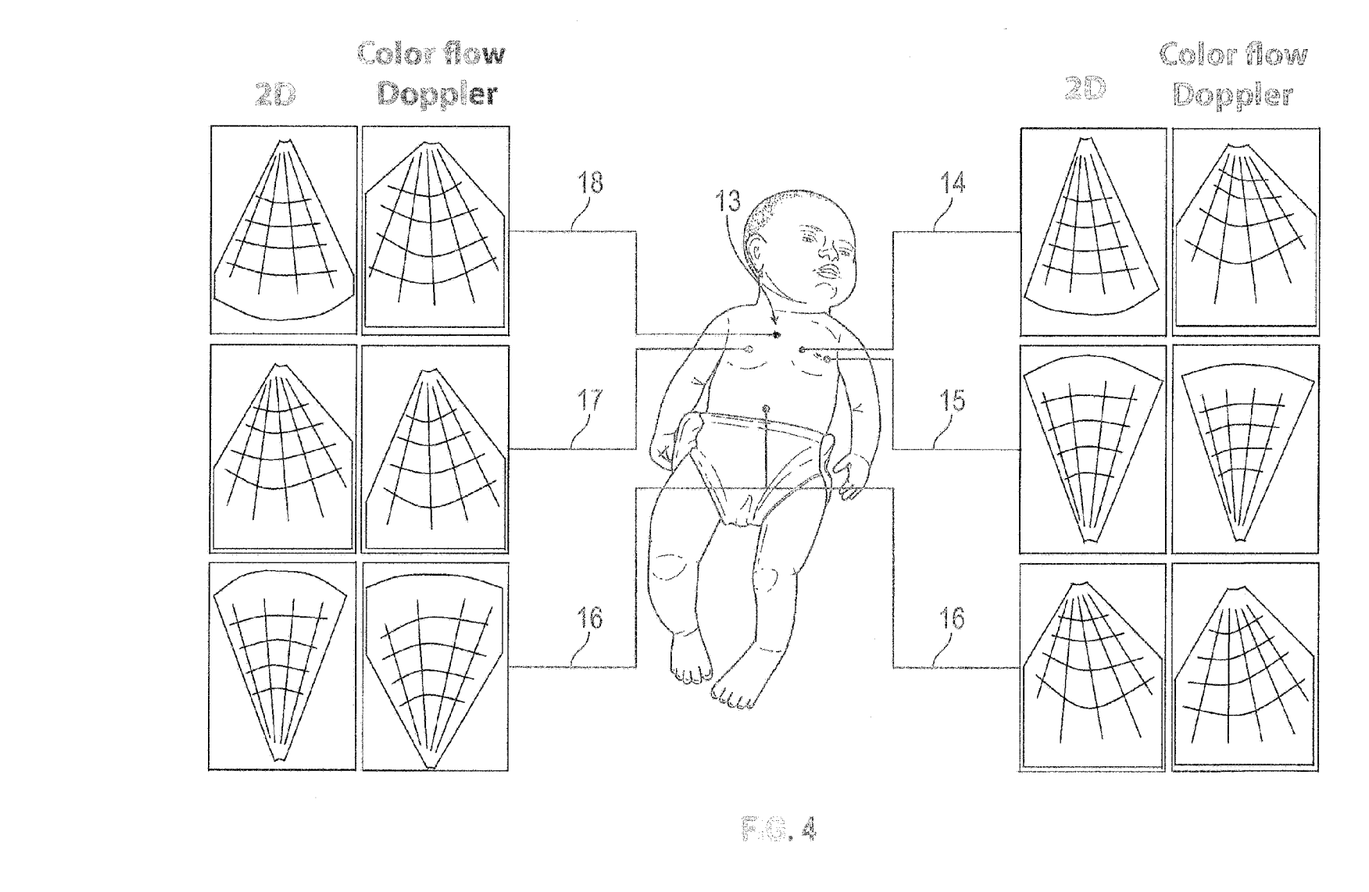
FIG. 4 shows samples of still frames of echocardiograms from five echocardiographic windows with loops of 2D echocardiograms obtained from 4D volumes and corresponding color flow video clips can be accessed seamlessly by pressing color flow button from video file folder.
Figure 5:
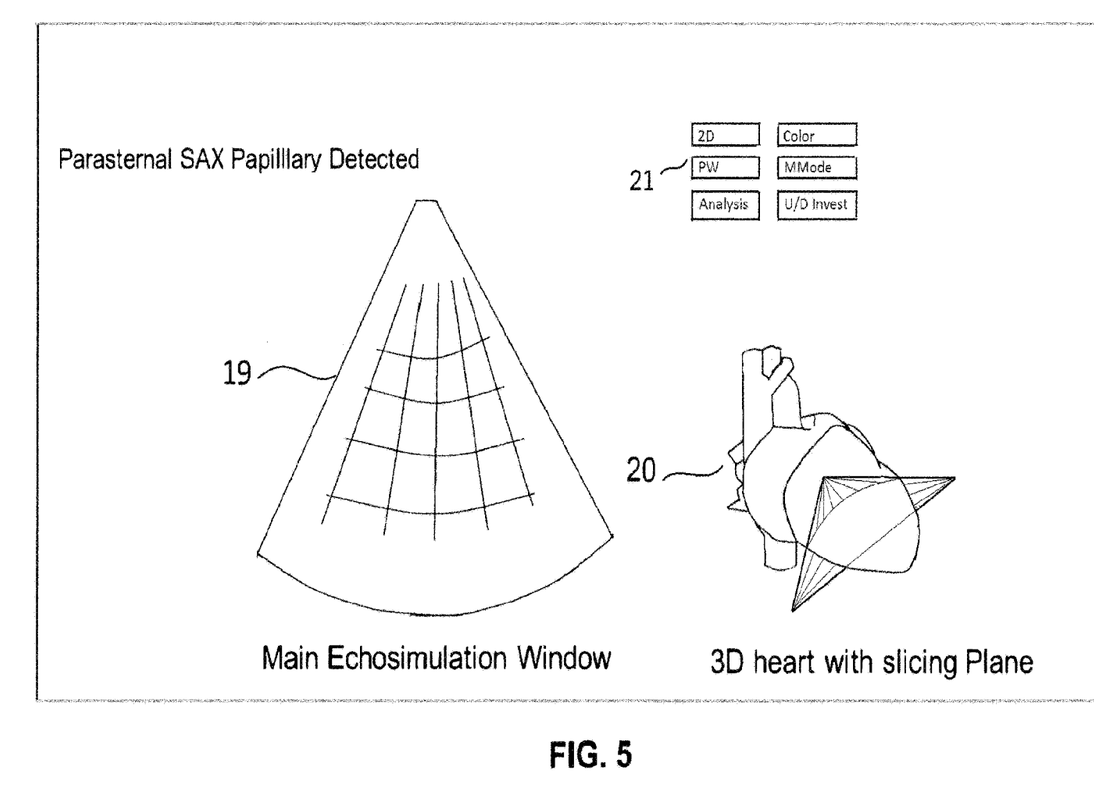
FIG. 5 is a snap shot of an embodiment of the display monitor in our echocardiographic training system showing a still frame of the 2D echocardiogram obtained from 4D volume. The trainee will observe the cutting plane through the three dimensional heart in the side window and the resulting 2D echocardiogram obtained from 4D volume on the main window.
Figure 6:
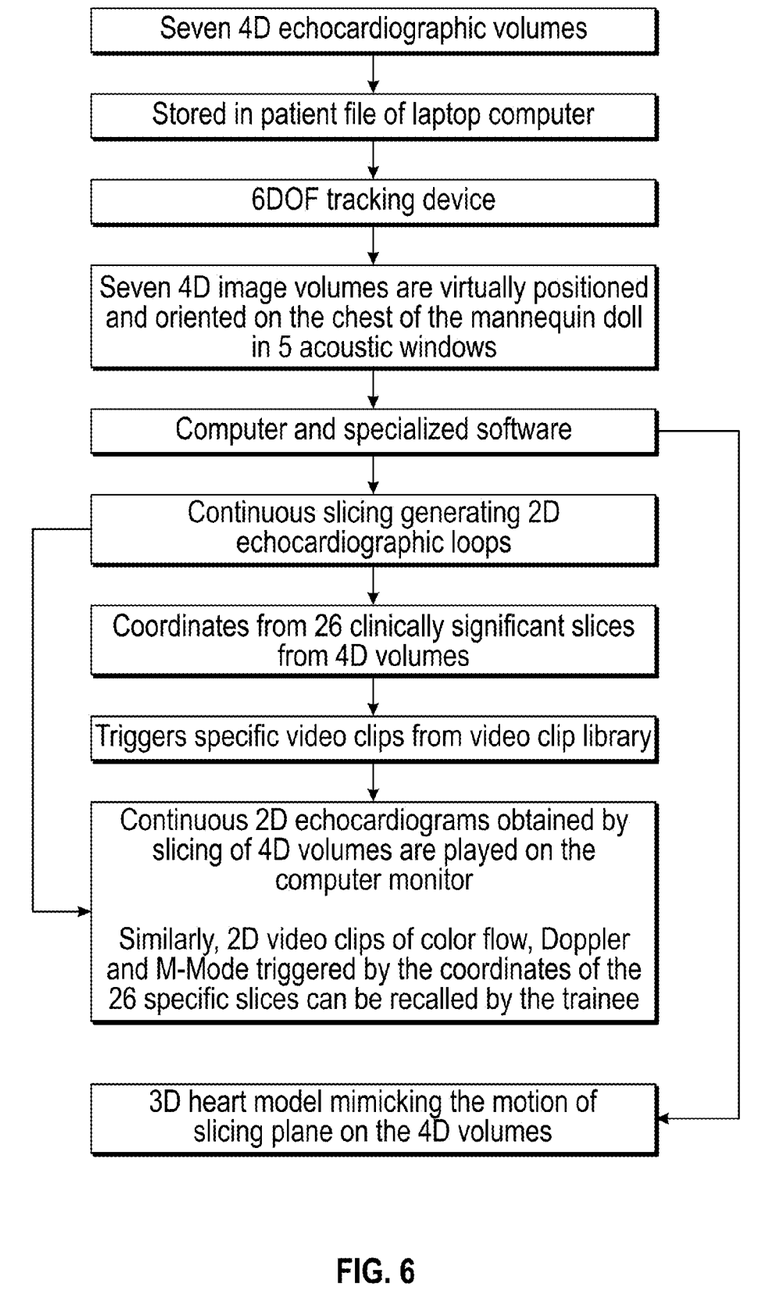
FIG. 6 is a block diagram of a method of storing and displaying data according to an embodiment of a virtual neonatal echocardiographic training system.

FIG. 6 is a block diagram of various components of the system which is mainly controlled by non-transitory machine readable program instructions (software) associated with computer 2. In one embodiment, computer 2 includes memory that stores data of echocardiographic information from one or more neonatal patients. In one embodiment, there is a folder associated with the memory of echocardiographic information collected from a live patient with normal cardiac structure and function as well as one or more folders of live patient(s) with functional or structural cardiac abnormalities. In one embodiment, a folder includes data relative to seven 4D echocardiographic recorded volumes. In one embodiment, as shown in FIG. 4, there may be five echocardiographic windows 13 for a neonate: left parasternal 14, apical 15, subcostal 16, right parasternal 17, and suprasternal 18. The seven echocardiographic recorded volumes, in one embodiment, are taken from each of the five echocardiographic windows. Of seven echocardiographic volumes, one each is positioned under left and right parasternal, one under apical and two under subcostal and suprasternal windows. As shown in FIG. 3, in one embodiment, 4D echocardiographic datasets 8 are sliced into 2D echocardiograms 9 using Visualization Tool Kit (VTK) programming tools and are displayed on the computer 2 monitor. Slicing of 4D volumes are done from the same point that the original 4D echocardiogram volumes 8 were recorded from the neonate and are virtually referenced relative to their appropriate echocardiographic window (shown in FIG. 4). Unlimited slices 4D echocardiographic volumes can be obtained by roll, pitch and yaw of the transducer 6 which controls the slicing plane and displayed as 2D echocardiograms on the computer monitor. However, the coordinates from 26 unique slices 9 are used to play 2D echocardiographic video clips of Color flow 10, Doppler 11 and M-Mode 12 which are recorded and stored separately in the computer memory. In one embodiment, as shown in FIG. 5, there may be five echocardiographic windows 13 for a neonate: left parasternal 14, apical 15, subcostal 16, right parasternal 17, and suprasternal 18.

The hardware of the VNETS system is oriented with respect to mannequin 1. Representatively, once transmitter 3 is placed on mannequin 1, locations of the five echocardiographic windows are determined according to x,y,z dimension distances. Since the position of the heart of neonate is fixed, similarly a virtual position of each 4D volume relative to its echocardiographic window is programmed in the software and 4D image volumes and their position and orientation data are stored in memory of computer 2.

Software is written using C++ programming language. In one embodiment, the software associates the position information of the five echocardiographic windows of mannequin 1 with the corresponding data related to 4D volumes, position and orientation of each 4D volume, range data necessary for playing 2D video clips of color flow, Doppler and M-Mode. A module allowing the user to perform hemodynamic measurements complements the training experience. Specific video clips can be tagged and set apart for detailed hemodynamic measurements.

Results

FIG. 4 show samples of still frames of echocardiograms from five echocardiographic windows (13) with continuous loops of 2D echocardiograms obtained from 4D volumes and 2D loops of color flow, Doppler and M-Mode from a video library. FIG. 5 is a snap shot of a display monitor of computer 2 showing a still frame of 2D echocardiogram 19 obtained from slicing of a 4D image volume and a 3D heart with the slicing plane in side display 20.

VNETS is the first Echocardiographic Simulator system developed using multiple real 4D echocardiographic image volumes combined with 2D echocardiographic video loops specifically for neonatal echocardiographic training. Addition of calculation package enables trainee to perform full range of hemodynamic measurements.

Example 2

FIG. 2 shows one non-limiting example of VNETS. Life size doll neonatal mannequin 1 is fitted with a magnetic tracking system that includes magnetic pulse wave generator 3 (e.g., a magnetic transmitter) positioned behind neonatal mannequin 1 and sensor 5 fitted into transducer 6. The five echocardiographic windows are predefined on the chest of the mannequin doll and the seven 4D volume images are virtually oriented and positioned under their appropriate echocardiographic windows. Of seven echocardiographic volumes, one each is positioned under left and right parasternal, one under apical and two under subcostal and suprasternal windows using the information derived from the computer and the tracking device. Similarly, a full range of 2D video clips of Color flow, Doppler and M-Mode which are recorded separately in addition to the 4D volumes are stored in a memory of computer 2 and display the data on a monitor of computer 2. Using transducer 6, in one embodiment, a trainee or user of the system must locate one or more of the five standard echocardiographic windows (13) on the chest of the doll mannequin 1. From a position of sensor 5 at an echocardiographic window, the trainee or user will be able to play continuous loops of 2D echocardiograms obtained from slicing of 4D volumes through roll, pitch and yaw of the transducer which controls the cutting planes. Thus, when sensor 5 is approximately located at a window, non-transitory program instructions associated with computer 2 transmit data relative to that window from a patient folder stored in memory of computer 2. When trainee encounters one or more of 26 clinically designated cuts, through their coordinates he will be able to play video loops of Color flow, Doppler and M-mode. Each patient folder contains subfolders containing 4D volumes, 2D video clips, range coordinates and orientation data specific to each patient. Program instructions associated with computer 2 are used to integrate, control and display all the above activities on a monitor of computer 2. In one embodiment, the program instructions display a three-dimensional model of the heart in a side screen of the monitor that duplicates the action of the slicing of the 4D image volumes.

Example 3

A method for using the VNETS system to train a trainee is disclosed. In one embodiment, a trainee needs to know the correct location of the five standard echocardiographic windows (13) to get images. By correctly choosing any one window, the 4D echocardiographic volume related to that window will become accessible for imaging. In one embodiment, the trainee positions transducer 6 on the chest of mannequin 1. Control module 4 reads data from magnetic pulse wave generator 3 and transducer and transmits the data (location and orientation data) to computer 2. If the data provided by magnetic pulse wave generator and 6DOF transducer corresponds to a location and orientation of an echocardiographic window, the window data will be accessible through computer. When the trainee places transducer 6 at an appropriate echocardiographic window 13, a 4D echocardiographic volume of a neonatal heart which has already been virtually positioned and oriented underneath that window will become available for slicing. Through the use of roll, pitch and yaw of the transducer 6 which controls the cutting plane, a continuous range of 2D echocardiographic loops 19 will be displayed on the computer monitor (FIG. 5). When encountering any of 26 standard echocardiographic images, the trainee will have the option of recalling the related video loops of color flow 10, Doppler 11 and M-mode 12 by touching the appropriate knob on the monitor or key on the keyboard of the computer 2. A calculation package that enables the trainee to perform full range of hemodynamic measurements is included. For example, the calculation package in the software allows the trainee to freeze or pause a video clip and perform measurements on various parts of the heart (e.g., size of a valve, ventricle, or degree of contraction) and evaluations of heart functions.

Various embodiments of the invention are described above in the Detailed Description. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventors that the words and phrases in the specification and claims be given the ordinary and accustomed meanings to those of ordinary skill in the applicable art(s).

The foregoing description of various embodiments of the invention known to the applicant at this time of filing the application has been presented and is intended for the purposes of illustration and description. The present description is not intended to be exhaustive nor limit the invention to the precise form disclosed and many modifications and variations are possible in the light of the above teachings. The embodiments described serve to explain the principles of the invention and its practical application and to enable others skilled in the art to utilize the invention in various embodiments and with various modifications as are suited to the particular use contemplated. Therefore, it is intended that the invention not be limited to the particular embodiments disclosed for carrying out the invention.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention.

The invention claimed is:

1. A neonatal echocardiographic simulator comprising:
   (i) a neonatal mannequin;
   (ii) a magnetic tracking system comprising:
      (a) a control module connected to a computer;
      (b) a magnetic pulse wave generator positioned on the mannequin and connected to the control module;
      (c) a transducer fitted with a sensor, said transducer configured to detect magnetic pulse waves from the generator and connected to the control module; the control module reading data from the generator and the transducer, and transmitting the data to the computer;
   (iii) the computer comprising a display monitor and a memory, the memory comprising;
      (a) data comprising exactly seven 4D echocardiographic image volumes taken from five echocardiographic windows of neonate patients, including the left parasternal, apical, subcostal, right parasternal and suprasternal, each 4D echocardiographic image volume recorded directly from the neonate patients using a window selected from the five echocardiographic windows and then virtually positioned under a corresponding window on the mannequin, said exactly seven 4D echocardiographic image volumes being used for optimal simulation of echocardiography of the neonate patients;

(b) said plurality of 4D echocardiographic image volumes comprise exactly one volume located under the left parasternal window, exactly one volume located under the apical window, exactly two volumes located under the subcoastal window, exactly one volume located under the right parasternal window, and exactly two volumes located under the suprasternal window;

(c) said each 4D echocardiographic image volume having an apex oriented to the window on the mannequin corresponding to the cardiac window on the neonate patient from which the 4D echocardiographic image volume was recorded, and further within the mannequin each 4D echocardiographic image volume is oriented towards a specific anatomical location for slicing to generate real-time 2D echocardiographic simulation; said slicing of the 4D echocardiographic image volume done from a point on the mannequin corresponding to the window associated with the 4D echocardiographic image volume;

(d) said slicing of the 4D echocardiographic image volumes is done on the mannequin from same point of origin that the original 4D echocardiographic image volumes were recorded from a neonate and virtually positioned under their corresponding echocardiographic windows on the mannequin, said point of origin being the apex of the 4D echocardiographic image volume;

(e) said slicing is done from the same point of origin by a use of roll, pitch and yaw orientation of the transducer, and coordinates of a 2D slice of the 4D echocardiographic image volume are obtained through the use of roll, pitch and yaw of the transducer and not using X, Y Z coordinates of the transducer;

(f) said coordinates obtained through the use of roll, pitch and yaw are used to activate video clips of color flow, Doppler, M-Mode, said video clips obtained from the same neonate from whom the original 4D echocardiographic image volume being sliced was recorded;

(g) 26 2D slices are obtained from the seven 4D image volumes to provide a complete range of echocardiographic evaluation in neonates and infants, and said video clips are related to the 26 2D slices;

(h) non-transitory program instructions associated with the computer transmit the data relative to the corresponding window stored in the memory of the computer, the transmitting of the data relative to the corresponding window initiated when the sensor of the transducer is located at the corresponding window on the mannequin; and (i) wherein when a trainee places the transducer at an appropriate echocardiographic window, the 4D echocardiographic volume of a neonatal heart which has already been virtually positioned and oriented underneath that window will become available for slicing, and through the use of roll, pitch and yaw of the transducer which controls a cutting plane, a continuous range of 2D echocardiographic loops will be displayed on the computer monitor, and upon encountering any of the 26 2D slices, the trainee will have the option of recalling the related video clips of color flow, Doppler and M-mode by touching an appropriate knob on the monitor or a key on a keyboard of the computer; and a calculation package enables the trainee to perform a range of hemodynamic measurements comprising freezing or pausing the video clip and performing evaluations of heart functions and measurements on various parts of the heart including size of a valve, ventricle, and degree of contraction.

2. The apparatus of claim 1, wherein the sensor-fitted transducer comprises a 6DOF sensor.

3. The apparatus of claim 1, wherein the magnetic tracking system tracks specific XYZ positions and yaw, pitch and roll orientations of the transducer in relation to the mannequin.

4. The apparatus of claim 1, wherein one or more of 2D color flow, Doppler and M-Mode video clips are displayed according to coordinates of specific slices of the 4D echocardiographic image volumes.

5. The apparatus of claim 4, wherein coordinates of 26 specific slices of the 4D echocardiographic image volumes are tracked in the memory of the computer.

6. The apparatus of claim 5, wherein for each coordinate of a specific slice, the control module transmits data to the computer and the computer displays a specific set of video clips.

7. The apparatus of claim 1, wherein a 3D model of a heart is stored in the memory of the computer and the apparatus comprises the non-transitory machine readable program instructions operable to display the 3D model of the heart on a side window on the display monitor.

8. The apparatus of claim 7, wherein the program instructions are also operable according to a transducer position and orientation of slicing planes of the 4D volumes, which are duplicated on the 3D model of the heart displayed in the side window on the display monitor, and 2D video loops obtained from the 4D echocardiographic volumes and video clips of colorflow, Doppler and M-mode obtained from coordinates of specific slices of the 4D echocardiographic volumes are displayed on a main window of the display monitor.

9. The apparatus of claim 1, further comprising the non-transitory machine readable program instructions operable to capture a displayed video of 2D echocardiogram, color flow Doppler, spectral Doppler and M-Mode for measurements of echocardiographic parameters.

10. The apparatus of claim 3, wherein the data transmitted to the computer comprises XYZ positions and yaw, pitch and roll orientations of the transducer in relation to the mannequin.

11. The apparatus of claim 10, wherein the XYZ positions of the transducer are in one or more echocardiographic windows on the mannequin.

12. The apparatus of claim 11, wherein the data comprising 4D echocardiographic volumes comprise slices by yaw, pitch and roll orientations of the transducer which controls cutting planes of the 4D volumes stored in the computer.

13. The apparatus of claim 11, wherein the data comprising the 4D echocardiographic volumes comprises data sliced from the apex of the image volume located in an echocardiographic window to yield a 2D video loop operable for display on the computer.

14. The apparatus of claim 11, wherein the 4D echocardiographic volumes are arrayed in specific orientation to enable detailed imaging from all echocardiographic windows.

15. The apparatus of claim 14, wherein the data comprising the 4D echocardiographic image volumes are arrayed in a specific orientation and location to enable slicing according to yaw, pitch and roll orientations to display 2D video loops on the computer.

\* \* \* \* \*